(12) United States Patent
Dantele

(10) Patent No.: US 6,550,869 B2
(45) Date of Patent: Apr. 22, 2003

(54) VEHICLE AXLE ASSEMBLY

(75) Inventor: Johann Dantele, Schwebheim (DE)

(73) Assignee: Otto Sauer Achsenfabrik Keilberg, Bessenbach-Keilberg (DE)

( * ) Notice: Subject to any disclaimer, the term of this patent is extended or adjusted under 35 U.S.C. 154(b) by 0 days.

(21) Appl. No.: 09/920,822

(22) Filed: Aug. 3, 2001

(65) Prior Publication Data

US 2002/0135225 A1 Sep. 26, 2002

(30) Foreign Application Priority Data

Mar. 21, 2001 (DE) .......................... 101 13 674

(51) Int. Cl.$^7$ ............................................... B60B 35/00
(52) U.S. Cl. ..................................... 301/124.1; 301/137
(58) Field of Search .............................. 301/124.1, 137, 301/125, 127, 132, 131; 280/124.116, 124.11, 124–128, 124.132; 180/905

(56) References Cited

U.S. PATENT DOCUMENTS

| | | | | |
|---|---|---|---|---|
| 1,492,258 A | * | 4/1924 | Murray et al. ................. | 219/67 |
| 1,965,267 A | | 7/1934 | Storer | |
| 1,991,199 A | * | 2/1935 | Ellele ......................... | 301/137 |
| 3,015,238 A | * | 1/1962 | Williams ...................... | 29/463 |
| 4,200,165 A | * | 4/1980 | Bowman et al. ............. | 180/253 |
| 4,951,962 A | * | 8/1990 | Tomida et al. ......... | 280/124.108 |
| 5,429,423 A | * | 7/1995 | Pollock et al. ........... | 301/124.1 |
| 5,664,847 A | * | 9/1997 | Bear et al. .................. | 301/137 |
| 5,690,353 A | | 11/1997 | Vandenberg | |
| 5,855,416 A | * | 1/1999 | Tasker et al. .............. | 188/18 A |
| 5,909,888 A | * | 6/1999 | Betz et al. ............ | 280/124.166 |
| 6,039,336 A | * | 3/2000 | Frey ..................... | 280/124.128 |
| 6,086,162 A | * | 7/2000 | Pinch et al. ............. | 301/124.1 |

FOREIGN PATENT DOCUMENTS

| | | |
|---|---|---|
| DE | 1 937 288 | 2/1971 |
| DE | 19 43 730 | 3/1971 |
| DE | 42 32 779 C1 | 2/1994 |
| DE | 0774369 A1 * | 5/1997 |
| DE | 198 18 698 | 6/1999 |
| EP | 0 137 953 B1 | 4/1985 |
| EP | 0 296 568 A1 | 12/1988 |
| EP | 0 600 198 A3 | 6/1994 |
| EP | 0 806 311 A2 | 11/1997 |
| EP | 0 830 960 A2 | 3/1998 |
| GB | 1 348 582 | 3/1974 |

OTHER PUBLICATIONS

MM. D. Stettmeier et al., A New Concept for Independent Wheel Rear Axle With Twisted Tubular Crossbar Fitted On Our PSA/FIAT Monospace, Aug./Sep. 1995, No. 699 Conference Congress EAEC.

Prospect of Ridewell Corp, Suspensions & Controls for the Transportation Industry.

Prospect of Ridewell Corp, Suspensions, Monopivot 240 Series.

\* cited by examiner

*Primary Examiner*—S. Joseph Morano
*Assistant Examiner*—Frantz F. Jules
(74) *Attorney, Agent, or Firm*—Wenderoth, Lind & Ponack, L.L.P.

(57) ABSTRACT

An axle unit with a vehicle axle a rigid axle body as an axle tube, with one radial arm each on both ends thereof. The radial arms are rigidly connected with the axle body, and one region of the arms forms the lower support for a spring element. The axle body and the two radial arms jointly are formed of two integral cast part halves that have been welded with one another along a partition line extending substantially in a horizontal plane.

13 Claims, 1 Drawing Sheet

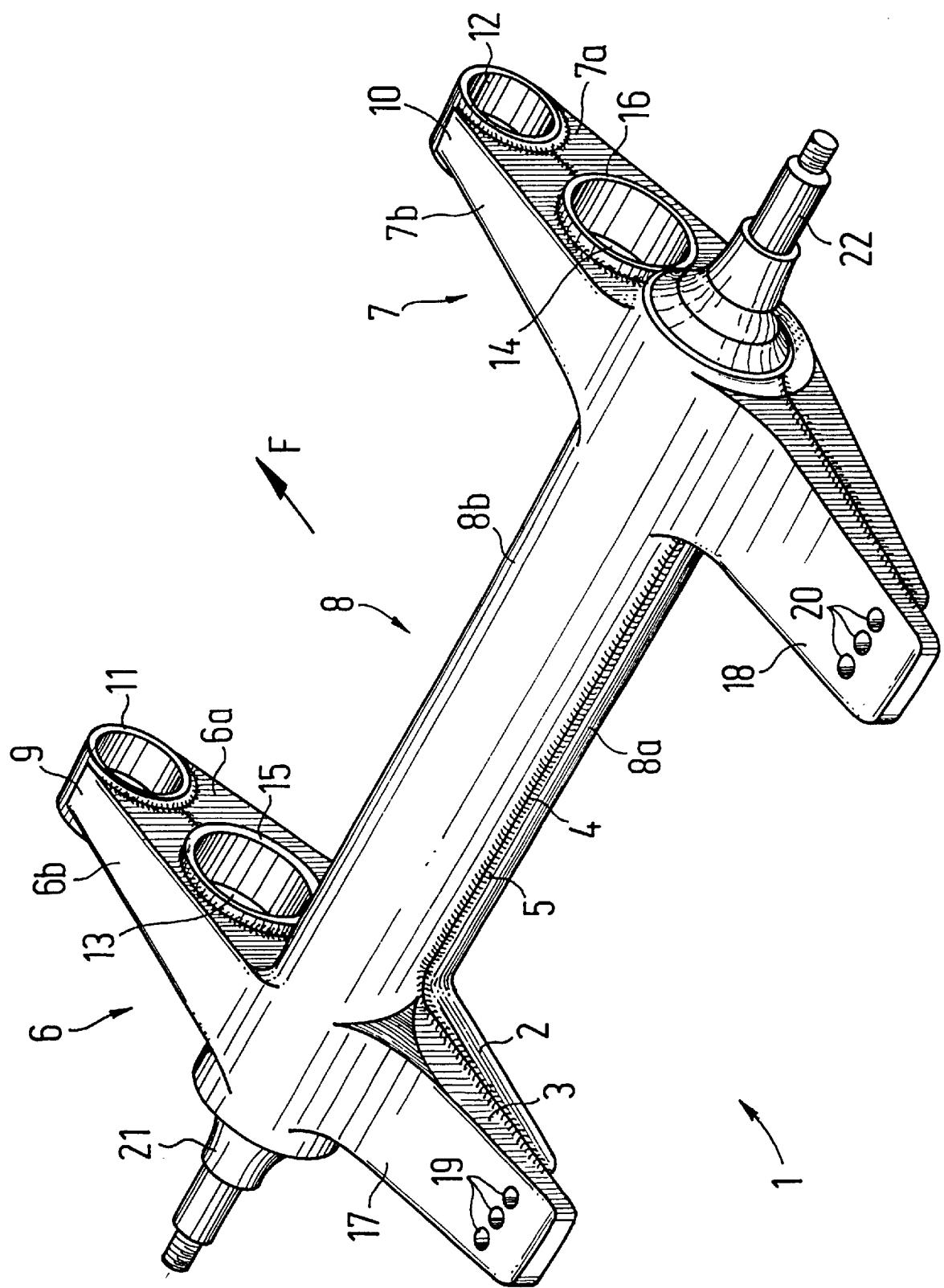

VEHICLE AXLE ASSEMBLY

BACKGROUND OF THE INVENTION

This application corresponds to German Patent Application 101 13 674.9, the entire disclosure of which is herein incorporated by reference.

1. Field of the Invention

The invention relates to an axle unit with a vehicle axle comprising a rigid axle body, developed, for example, as an axle tube having one radial arm each on both sides of the vehicle's longitudinal mid-plane, which radial arm at a first front end is articulatable on a bearing point, stationary on the chassis, and, spaced apart therefrom, is rigidly connected with the axle body, and which forms in the region of its back end, opposing the first end, the lower support of a spring element, on whose upper side is stayed the vehicle chassis.

2. Description of Related Art

An exemplary axle unit as described above has been disclosed in EP-A-0 806 311 or EP-A-0 830 960. For example, a special axle tube can be used for the axle body, wherein the cross section or wall thickness in the region of the connection with the separate radial arms may be increased through a compression process. The radial arms are independent and essentially box-shaped, wherein the perpendicular sidewalls, bottom, and top walls are welded to one another. The rigid connection of the radial arms with the axle body is provided by at least regionally encircling circumferential welds, which require high precision in production, and which are subjected to high loads during use.

SUMMARY OF THE INVENTION

It is the object of the present invention to further develop the axle unit cited in the introduction such that production, mounting expenses, as well as the weight can be further reduced at low manufacturing costs, without diminishing the reliability and strength of the axle unit.

An axle unit in accordance with the invention includes an axle body and two radial arms, wherein the axle unit comprises two cast part halves that are connected with one another. The two cast halves may be connected together substantially horizontally, along a partition line, such that the axle body rigidly connects both radial arms with one another. In an exemplary embodiment, the two cast halves are welded together. The upper axle body half and the lower axle body half are herein also each essentially integrally connected with two upper radial arm halves and two lower radial arm halves, respectively, which complement each other.

Such shell-like cast part halves can be cost-effectively manufactured from sheet metal with suitable pressing or forging devices at low cost and in large numbers. Bracing or welding of separate radial arms with the axle body, and the work-intensive joining of the radial arms from several wall elements, such as required in the prior art arrangements, can be omitted. In an exemplary embodiment of the axle unit of the present invention, welding is only required in order to connect the two cast part halves in the region of the substantially horizontally extending partition line, in which loading is low. Furthermore, casting of the cast part halves provides a weight and load-optimizing wall thickness distribution in the axle unit. Thus it is possible to increase the material thickness in the high-load region of the connection of the radial arms with the axle body, and correspondingly to decrease it in regions that are less subject to loading. The axle unit according to the invention thereby attains high rigidity while simultaneously retains low weight.

The rigidity of the axle unit can be further increased while maintaining a relatively low weight by connecting the two cast part halves having a hollow volume. With this hollow construction, bending and torque moments, which exert an effect on the axle unit, are especially well absorbed.

If a bearing sleeve is developed or disposed at the front ends of each radial arm to connect the radial arms with the vehicle chassis, it is possible, while retaining the geometry of the axle unit, to use bearing sleeves that are individually matched to the vehicle chassis. Additionally, in this manner different materials can be used for bearing sleeves and cast part halves. In an exemplary embodiment, the bearing sleeves may be made of copper alloys. The bearing sleeves can be simply, yet securely, fastened by welding them on the radial arms, wherein the strength of the axle body is simultaneously increased.

The axle unit according to the invention can be employed in different types of vehicle chassis. Specifically, several throughbores may be provided at the back ends of the radial arms, wherein the throughbores may extend substantially perpendicularly to the plane of the partition line, in order to fasten spring elements on the radial arms. The spring elements are fastened in different throughbores, as a function of the size of the spring elements, which are preferably formed by one pneumatic spring bellows each, and the geometry of the vehicle chassis. In an exemplary embodiment, the spring elements are fastened in the through bores with a threaded stem. Due to the broad applicability of the axle unit in a variety of vehicle chassis types, the production costs, and in particular the costs for the casting tools of the cast part halves, can be kept low. Furthermore, a shock absorber attachment can take place in a manner known per se.

In order to be able to dispose a brake, such as for example a fixed caliper disk brake, in a space-saving and protected manner and in accordance with a preferred implementation of the present invention, a through-opening each is provided in the radial arms between the region connected with the axle body and the front end. Functional elements of a brake system can be accommodated in this through-opening without unnecessarily enlarging the constructional space in the region of the wheel suspension. The strength of the axle unit can be further increased by positioning an annular lining in the through-opening and welding the annular lining to the cast part halves.

An axle journal is preferably rigidly fastened in both side openings of the axle body in order to connect wheels with the axle unit. This axle journal can be pressed into the axle body, developed as an axle tube, and, if appropriate, welded to, or connected with, the axle unit in other ways. In this way, it is possible to employ differently dimensioned axle journals with a single axle unit geometry.

According to another implementation of the invention, roller bearings are provided in both side openings of the axle body. In this implementation, the wheels can be received in the bearing unit in the axle body via an extension of the wheel hub. In this development of the axle unit, the structuring of the wheels, or the brake, is also largely independent of the geometry of the axle unit, such that it can be variably employed for different vehicle types.

BRIEF DESCRIPTION OF THE DRAWING

In the following, an embodiment of the invention will be described by example and with reference to the drawing.

The sole FIGURE shows an exemplary axle unit according to the invention, in a schematic perspective view.

DETAILED DESCRIPTION OF THE INVENTION

The axle unit 1 is combined of a lower cast part half 2, and an upper cast part half 3. Along a substantially horizontally extending partition line 4, the two cast part halves 2 and 3 are connected with one another via a welding seam 5 and define a hollow volume between them. The two cast part halves 2 and 3 are each profiles that are pressed or forged from sheet metal, which have a wall thickness of a few centimeters, e.g., approximately 5 mm.

Each of the cast part halves 2 and 3 is developed in the form of an H with two radial arm halves 6a, 7a, and 6b, 7b, respectively, parallel to one another. The radial arm halves 6a, 6b and 7a, 7b are each integrally connected via axle body halves 8a and 8b respectively, such that the axle body halves 8a, 8b extend approximately perpendicularly to the radial arm halves 6a, 6b and 7a, 7b. The radial arm halves 6a, 6b and 7a, 7b when combined, form radial arms 6 and 7, respectively, in whose center region, the axle body 8, combined of axle body halves 8a, 8b, branches off in the form of an axle tube. In the exemplary embodiment shown, the axle tube 8 has a diameter of approximately 200 mm.

The ends 9 and 10, which are the front of the radial arms 6 and 7 in the direction of travel indicated by arrow F, respectively, are articulatable on a bearing point on the vehicle chassis (not shown in the FIGURE). To this end, bearing sleeves 11 and 12, respectively, are developed or disposed in the front ends 9 and 10 of radial arms 6 and 7. In the embodiment depicted in the FIGURE, each front end 9 and 10, of radial arms 6 and 7, comprise a half-cylindrical recess, into which the annular bearing sleeve 11 and 12, respectively, are welded around the circumference. Bearing sleeves 11 and 12 themselves can be coated on the inside, for example, with a copper alloy, or they can be formed entirely of an alloy, with good bearing properties.

Between bearing sleeves 11 and 12 and the branches of the axle body 8, through-openings 13 and 14 are provided in each radial arm 6 and 7, respectively, into which annular linings 15 and 16, respectively, are welded to increase the strength of the axle unit 1. In each instance, in these through-openings 13 and 14, functional elements of a brake system (not shown) can be received in proximity to the axle after axle unit 1 is mounted. The contour of through-openings 13 and 14 as well as linings 15 and 16 inserted therein, are not limited to a circular shape. On the contrary, an elliptical geometry or any other geometry can be used depending on the dimension and structure of the brake system.

Two sets of three through holes 19 and 20 are provided in flattened ends 17 and 18, respectively, which are the rearward ends of radial arms 6 and 7 with respect to the direction of travel F, respectively. Through holes 19 and 20 are offset with respect to one another, perpendicularly to the vertical longitudinal vehicle mid-plane. By means of threaded stems, spring elements (not depicted) can be fastened in one or several of through holes 19 and 20 on radial arms 6 and 7, respectively, such that the back ends 17 and 18 of radial arms 6 and 7, respectively, form supports for these spring elements. Non-limiting examples of spring elements include pneumatic spring bellows. The vehicle chassis may be placed in this case, on the upper side of the spring elements. By providing several through holes 19 and 20 in radial arms 6 and 7, respectively, it is possible to fasten the spring elements, depending on the dimensions of the vehicle chassis, at differing spacings from the perpendicular longitudinal vehicle mid-plane.

In the embodiment depicted in the FIGURE, axle journals 21 and 22 are received in the two opposing side openings of axle body 8 and joined with it by being pressed and/or welded into the axle tube opening. On axle journals 21 and 22, in known manner, one or more wheels (not shown) can be received. To this end, each axle journal 21, 22 has threaded sections on its end facing outwardly.

According to an alternative implementation, it is also possible to dispose in axle body 8, instead of the axle journals 21 and 22 depicted in the FIGURE, roller bearings with which wheel hubs can be rotatably supported, with the outer bearing ring being securely connected with axle body 8.

The foregoing description of various preferred embodiments of the present invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A vehicle axle assembly comprising:

a top part integrally comprising a top rigid axle body portion having a first end and a second end, said first end of said top rigid axle body portion and said second end of said top rigid axle body portion being separated by a length, a top first radial arm portion at said first end of said top rigid axle body portion, and a top second radial arm portion at said second end of said top rigid axle body portion;

a bottom part integrally comprising a bottom rigid axle body portion having a first end and a second end, said first end of said bottom rigid axle body portion and said second end of said bottom rigid axle body portion being separated by a length, a bottom first radial arm portion at said first end of said bottom rigid axle body portion, and a bottom second radial arm portion at said second end of said bottom rigid axle body portion;

a first bearing sleeve positioned in a first front end at first stationary bearing point;

a second bearing sleeve positioned in a second front end at second stationary bearing point;

a first through hole positioned in said first front end;

a second through hole positioned in said second front end, a first set of through holes positioned in said first region; and a second set of through holes positioned in said second region, wherein said top part is connected to said bottom part such that said top rigid axle body portion, said top first radial arm portion, and said top second radial arm portion, connect with said bottom rigid axle body portion, said bottom first radial arm portion, and said bottom second radial arm portion, respectively, wherein the connected said top first radial arm portion and said bottom first radial arm portion comprises said first front end having said first stationary bearing point, and a first back end having said first region capable of supporting a spring element, and wherein the connected said top second radial arm portion and said bottom second radial arm portion comprises said second front end having said second stationary bearing point, and a second back end having said second region capable of supporting a spring element.

2. A vehicle axle assembly comprising:

a top part integrally comprising a top rigid axle body portion having a first end and a second end, said first end of said top rigid axle body portion and said second end of said top rigid axle body portion being separated by a length, a top first radial arm portion at said first end of said top rigid axle body portion, and a top second radial arm portion at said second end of said top rigid axle body portion;

a bottom part integrally comprising a bottom rigid axle body portion having a first end and a second end, said first end of said bottom rigid axle body portion and said second end of said bottom rigid axle body portion being separated by a length, a bottom first radial arm portion at said first end of said bottom rigid axle body portion, and a bottom second radial arm portion at said second end of said bottom rigid axle body portion;

a first through hole positioned in a first front end; and a second through hole positioned in a second front end, wherein said top part is connected to said bottom part such that said top rigid axle body portion, said top first radial arm portion, and said top second radial arm portion, connect with said bottom rigid axle body portion, said bottom first radial arm portion, and said bottom second radial arm portion, respectively, wherein the connected said top first radial arm portion and said bottom first radial arm portion comprise said first front end having a first stationary bearing point, and a first back end having a first region capable of supporting a spring element, and wherein the connected said top second radial arm portion and said bottom second radial arm portion comprises said second front end having a second stationary bearing point, and a second back end having a second region capable of supporting a spring element.

3. The vehicle axle assembly as claimed in claim 2, further comprising:

a first set of through holes positioned in said first region; and a second set of through holes positioned in said second region.

4. A vehicle axle assembly comprising:

a top part integrally comprising a top rigid axle body portion having a first end and a second end, said first end of said top rigid axle body portion and said second end of said top rigid axle body portion being separated by a length, a top first radial arm portion at said first end of said top rigid axle body portion, and a top second radial arm portion at said second end of said top rigid axle body portion;

a bottom part integrally comprising a bottom rigid axle body portion having a first end and a second end, said first end of said bottom rigid axle body portion and said second end of said bottom rigid axle body portion being separated by a length, a bottom first radial arm portion at said first end of said bottom rigid axle body portion, and a bottom second radial arm portion at said second end of said bottom rigid axle body portion;

a first set of through holes positioned in a first region; and a second set of through holes positioned in a second region, wherein said top part is connected to said bottom part such that said top rigid axle body portion, said top first radial arm portion, and said top second radial arm portion, connect with said bottom rigid axle body portion, said bottom first radial arm portion, and said bottom second radial arm portion, respectively, wherein the connected said top first radial arm portion and said bottom first radial arm portion comprises a first front end having a first stationary bearing point, and a first back end having said first region capable of supporting a spring element, and wherein the connected said top second radial arm portion and said bottom second radial arm portion comprises a second front end having a second stationary bearing point, and a second back end having said second region capable of supporting a spring element.

5. A vehicle axle assembly comprising:

a top part integrally comprising a top rigid axle body portion having a first end and a second end, said first end of said top rigid axle body portion and said second end of said top rigid axle body portion being separated by a length, a top first radial arm portion at said first end of said top rigid axle body portion, and a top second radial arm portion at said second end of said top rigid axle body portion; and a bottom part integrally comprising a bottom rigid axle body portion having a first end and a second end, said first end of said bottom rigid axle body portion and said second end of said bottom rigid axle body portion being separated by a length, a bottom first radial arm portion at said first end of said bottom rigid axle body portion, and a bottom second radial arm portion at said second end of said bottom rigid axle body portion;

wherein said top part is connected to said bottom part such that said top rigid axle body portion, said top first radial arm portion, and said top second radial arm portion, connect with said bottom rigid axle body portion, said bottom first radial arm portion, and said bottom second radial arm portion, respectively, wherein said top part is connected to said bottom part by a weld.

6. A vehicle axle assembly comprising:

a top formed part integrally comprising a top rigid axle body portion having a first end and a second end, said first end of said top rigid axle body portion and said second end of said top rigid axle body portion being separated by a length, a top first radial arm portion at said first end of said top rigid axle body portion, and a top second radial arm portion at said second end of said top rigid axle body portion;

a bottom formed part integrally comprising a bottom rigid axle body portion having a first end and a second end, said first end of said bottom rigid axle body portion and said second end of said bottom rigid axle body portion being separated by a length, a bottom first radial arm portion at said first end of said bottom rigid axle body portion, and a bottom second radial arm portion at said second end of said bottom rigid axle body portion;

a first bearing sleeve positioned in a first front end at said first stationary bearing point;

a second bearing sleeve positioned in a second front end at said second stationary bearing point;

a first through hole positioned in a first front end; and a second through hole positioned in a second front end, wherein said top formed part is connected to said bottom formed part along a partition line extending essentially in a plane such that said top rigid axle body portion, said top first radial arm portion, and said top second radial arm portion, connect with said bottom rigid axle body portion, said bottom first radial arm portion, and said bottom second radial arm portion, respectively, wherein said top formed part and said bottom formed part includes a hollow volume therebetween, wherein the connected said top first radial arm portion and said bottom first radial arm portion comprises said first front end having said first stationary bearing point, and a first back end having a first region capable of supporting a spring element, and wherein the connected said top second radial arm portion and said bottom second radial arm portion comprises said second front end having said second stationary bearing point, and a second back end having a second region capable of supporting a spring element.

7. The vehicle axle assembly as claimed in claim 6, further comprising:

a first set of through holes positioned in a first region; and a second set of through holes positioned in a second region.

8. A vehicle axle assembly comprising:

a top formed part integrally comprising a top rigid axle body portion having a first end and a second end, said first end of said top rigid axle body portion and said second end of said top rigid axle body portion being separated by a length, a top first radial arm portion at said first end of said top rigid axle body portion, and a top second radial arm portion at said second end of said top rigid axle body portion;

a bottom formed part integrally comprising a bottom rigid axle body portion having a first end and a second end, said first end of said bottom rigid axle body portion and said second end of said bottom rigid axle body portion being separated by a length, a bottom first radial arm portion at said first end of said bottom rigid axle body portion, and a bottom second radial arm portion at said second end of said bottom rigid axle body portion;

a first through hole positioned in a first front end; and a second through hole positioned in a second front end, wherein said top formed part is connected to said bottom formed part along a partition line extending essentially in a plane such that said top rigid axle body portion, said top first radial arm portion, and said top second radial arm portion, connect with said bottom rigid axle body portion, said bottom first radial arm portion, and said bottom second radial arm portion, respectively, wherein said top formed part and said bottom formed part includes a hollow volume therebetween, wherein the connected said top first radial arm portion and said bottom first radial arm portion comprises said first front end having a first stationary bearing point, and a first back end having a first region capable of supporting a spring element, and wherein the connected said top second radial arm portion and said bottom second radial arm portion comprises said second front end having a second stationary bearing point, and a second back end having a second region capable of supporting a spring element.

9. The vehicle axle assembly as claimed in claim 8, further comprising:

a first set of through holes positioned in said first region; and a second set of through holes positioned in said second region.

10. The vehicle axle assembly as claimed in claim 9, further comprising:

a first axle journal rigidly fastened to said first end of said top formed part and said first end of said bottom formed part; and a second axle journal rigidly fastened to said second end of said top formed part and said second end of said bottom formed part.

11. A vehicle axle assembly comprising:

a top formed part integrally comprising a top rigid axle body portion having a first end and a second end, said first end of said top rigid axle body portion and said second end of said top rigid axle body portion being separated by a length, a top first radial arm portion at said first end of said top rigid axle body portion, and a top second radial arm portion at said second end of said top rigid axle body portion;

a bottom formed part integrally comprising a bottom rigid axle body portion having a first end and a second end, said first end of said bottom rigid axle body portion and said second end of said bottom rigid axle body portion being separated by a length, a bottom first radial arm portion at said first end of said bottom rigid axle body portion, and a bottom second radial arm portion at said second end of said bottom rigid axle body portion;

a first set of through holes positioned in a first region; and a second set of through holes positioned in a second region, wherein said top formed part is connected to said bottom formed part along a partition line extending essentially in a plane such that said top rigid axle body portion, said top first radial arm portion, and said top second radial arm portion, connect with said bottom rigid axle body portion, said bottom first radial arm portion, and said bottom second radial arm portion, respectively, wherein said top formed part and said bottom formed part includes a hollow volume therebetween, wherein the connected said top first radial arm portion and said bottom first radial arm portion comprises a first front end having a first stationary bearing point, and a first back end having said first region capable of supporting a spring element, and wherein the connected said top second radial arm portion and said bottom second radial arm portion comprises a second front end having a second stationary bearing point, and a second back end having said second region capable of supporting a spring element.

12. A vehicle axle assembly comprising:

a top formed part integrally comprising a top rigid axle body portion having a first end and a second end, said first end of said top rigid axle body portion and said second end of said top rigid axle body portion being separated by a length, a top first radial arm portion at said first end of said top rigid axle body portion, and a top second radial arm portion at said second end of said top rigid axle body portion; and a bottom formed part integrally comprising a bottom rigid axle body portion having a first end and a second end, said first end of said bottom rigid axle body portion and said second end of said bottom rigid axle body portion being separated by a length, a bottom first radial arm portion at said first end of said bottom rigid axle body portion, and a bottom second radial arm portion at said second end of said bottom rigid axle body portion;

wherein said top formed part is connected to said bottom formed part along a partition line extending essentially in a plane such that said top rigid axle body portion, said top first radial arm portion, and said top second radial arm portion, connect with said bottom rigid axle body portion, said bottom first radial arm portion, and said bottom second radial arm portion, respectively, wherein said top formed part and said bottom formed part includes a hollow volume therebetween, and wherein said top formed part is connected to said bottom formed part by a weld.

13. The vehicle axle assembly as claimed in claim 12, wherein said top formed part and said bottom formed part comprise shell-like form parts.

* * * * *